United States Patent
Sunayama

(10) Patent No.: US 12,269,306 B2
(45) Date of Patent: Apr. 8, 2025

(54) TIRE VALVE AND METHOD FOR PRODUCING TIRE VALVE

(71) Applicant: PACIFIC INDUSTRIAL CO., LTD., Ogaki (JP)

(72) Inventor: Yuki Sunayama, Hashima (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 622 days.

(21) Appl. No.: 17/632,411

(22) PCT Filed: Nov. 4, 2020

(86) PCT No.: PCT/JP2020/041159
§ 371 (c)(1),
(2) Date: Feb. 2, 2022

(87) PCT Pub. No.: WO2022/097187
PCT Pub. Date: May 12, 2022

(65) Prior Publication Data
US 2022/0355629 A1    Nov. 10, 2022

(51) Int. Cl.
*B60C 29/02*    (2006.01)
(52) U.S. Cl.
CPC .................................. *B60C 29/02* (2013.01)
(58) Field of Classification Search
CPC .... B60C 29/02; B60C 29/005; B60C 23/0498
See application file for complete search history.

(56) References Cited

U.S. PATENT DOCUMENTS 2,962,073 A * 11/1960 Reed ..................... B60C 29/02
                                                        152/427
4,016,918 A *  4/1977 Thacker ................ B60C 29/06
                                                        152/415
(Continued)

FOREIGN PATENT DOCUMENTS

CN    101638040 A    2/2010
CN    105150776 A    12/2015
(Continued)

OTHER PUBLICATIONS

Jun. 19, 2024 Office Action issued in Chinese Patent Application No. 202080055970.5.
(Continued)

*Primary Examiner* — S. Joseph Morano
*Assistant Examiner* — Emily G. Castonguay
(74) *Attorney, Agent, or Firm* — Oliff PLC

(57) ABSTRACT

A tire valve includes a grommet fitted on an outside of a valve stem on a proximal end side, the tire valve being inserted into a valve attachment hole from a distal end side, the grommet having a proximal end portion engaging with the valve attachment hole, a stem step portion provided on an outer surface of the valve stem and increasing in diameter at the proximal end side and facing toward the distal end side, a ring provided on the grommet in a portion on the distal end side of the stem step portion and restricting axial movements of the ring relative to the grommet, and a pressed portion provided on the grommet between the stem step portion and the ring to be pressed between the stem step portion and the ring wherein the grommet receives a load applied toward the proximal end side of the valve stem.

9 Claims, 8 Drawing Sheets

(56) References Cited

U.S. PATENT DOCUMENTS

| | | | |
|---|---|---|---|
| 2005/0087228 A1 | 4/2005 | Uleski | |
| 2010/0024539 A1 | 2/2010 | Hamm et al. | |
| 2011/0168314 A1* | 7/2011 | Palaoro | B60C 29/00 |
| | | | 152/427 |
| 2015/0328944 A1* | 11/2015 | Chen | B60C 29/066 |
| | | | 152/428 |
| 2015/0375583 A1 | 12/2015 | Chen | |
| 2017/0241566 A1 | 8/2017 | Taki | |
| 2018/0038500 A1 | 2/2018 | Mori | |
| 2018/0119834 A1* | 5/2018 | Johnson | F16K 15/20 |
| 2020/0001668 A1 | 1/2020 | Buttimer et al. | |
| 2020/0298636 A1 | 9/2020 | Mieyan et al. | |
| 2020/0331311 A1 | 10/2020 | Courtney et al. | |

FOREIGN PATENT DOCUMENTS

| | | | |
|---|---|---|---|
| CN | 108025605 A | 5/2018 | |
| CN | 111194273 A | 5/2020 | |
| FR | 2975342 A1 | 11/2012 | |
| GB | 2526893 A | 12/2015 | |
| JP | 3192996 B2 | 7/2001 | |
| JP | 2012-047686 A | 3/2012 | |
| JP | 2012-091568 A | 5/2012 | |
| JP | 2013-241137 A | 12/2013 | |
| JP | 2014-073843 A | 4/2014 | |
| JP | 3192993 U | 9/2014 | |
| JP | 2015-074281 A | 4/2015 | |
| JP | 2017-149251 A | 8/2017 | |

OTHER PUBLICATIONS

Jan. 12, 2021 International Search Report issued in International Patent Application No. PCT/JP2020/041159.
Mar. 16, 2024 Office Action issued in Chinese Patent Application No. 202080055970.5.
Sep. 5, 2022 Search Report issued in European Patent Application No. 20947809.8.
Sep. 19, 2022 Office Action issued in European Patent Application No. 20947809.8.

* cited by examiner

TIRE VALVE AND METHOD FOR PRODUCING TIRE VALVE

TECHNICAL FIELD

The present disclosure relates to a tire valve attached to a tire wheel and a method for producing the same.

BACKGROUND ART

A snap-in tire valve is known as one of conventional tire valves of this type, wherein the distal end side of the valve stem is inserted into a valve attachment hole of a tire wheel, and an elastic member disposed around the valve stem engages with the valve attachment hole (see, for example, Patent Literature 1). For tire valves of this type, a grommet that is an elastomeric tube could be used as the elastic member.

RELATED ART DOCUMENTS

Patent Documents

Patent Document 1: JP 2013-241137 A (paragraph [0013], FIG. 4, etc.)

DISCLOSURE OF THE INVENTION

Problems to be Solved by the Invention

When mounting the tire valve described above to a tire wheel, it is desirable to prevent the grommet from coming off of the valve stem.

Solutions to Problems

A tire valve according to the present disclosure includes a grommet fitted on an outside of a valve stem on a proximal end side, which is one end side of the valve stem, the tire valve being inserted into a valve attachment hole of a tire wheel from a distal end side, which is an other end side of the valve stem, the grommet having a proximal end portion engaging with the valve attachment hole. The tire valve further includes: a stem step portion provided on an outer surface of the valve stem in a portion where the grommet is fitted, the stem step portion increasing in diameter at the proximal end side and facing toward the distal end side, a ring provided on the grommet in a portion on the distal end side of the stem step portion of the valve stem and restricting axial movements of the ring relative to the grommet, and a pressed portion provided on the grommet between the stem step portion and the ring, to be pressed between the stem step portion and the ring wherein the grommet receives a load applied toward the proximal end side of the valve stem.

MODE FOR CARRYING OUT THE INVENTION

First Embodiment

Figure 1:
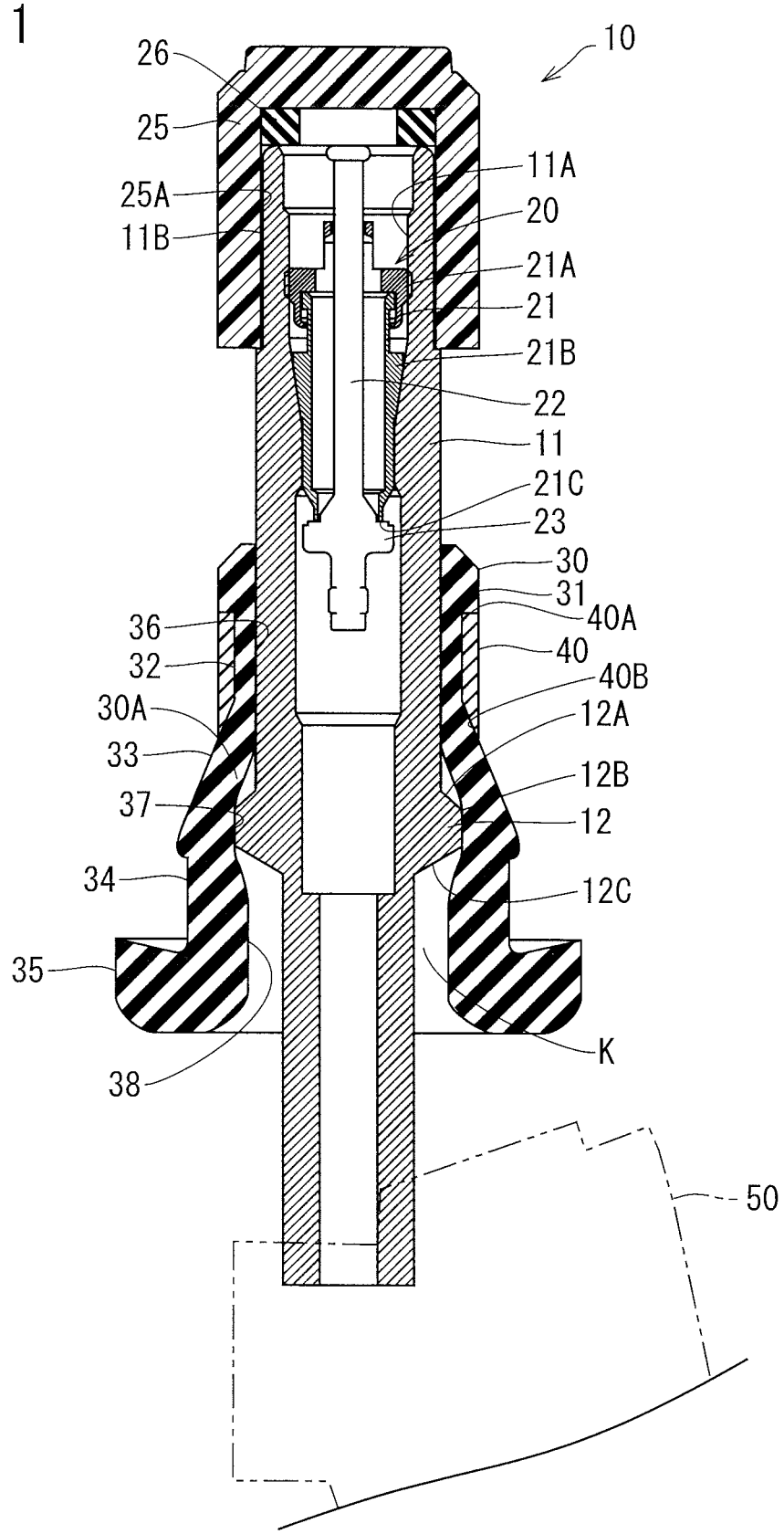
FIG. 1 is a cross-sectional side view of a tire valve according to a first embodiment.

Hereinafter, a tire valve 10 of this embodiment will be described with reference to FIG. 1 to FIG. 3. As illustrated in FIG. 1, the tire valve 10 has a structure in which a valve core 20 is provided inside a valve stem 11 that is a metal tube, and a grommet 30 that is an elastomeric tube is fitted over the valve stem 11. Hereinafter, unless specifically mentioned otherwise, the upper side of FIG. 1 shall be the distal end side, and the lower side of FIG. 1 shall be the proximal end side.

The valve core 20 is configured such that a linearly movable rod 22 passes through a center part of a tubular core body 21. The tubular core body 21 includes a head part 21A mated with an internal thread 11A formed on an inner surface of the valve stem 11, and a body part 21B that fits in the valve stem 11 and provides a seal.

A valve body 23 is provided to a portion of the linearly movable rod 22 protruding from the tubular core body 21 toward the proximal end side. A coil spring (not shown) is arranged between a distal end of the tubular core body 21 and a distal end portion of the linearly movable rod 22, the spring applying a resilient force to press the valve body 23 toward a proximal end opening 21C of the tubular core body 21 in a normal state. Therefore, normally, fluid cannot pass through the valve core 20. Either when the linearly movable rod 22 is pushed from the distal end side, or when the pressure inside the valve stem 11 on the distal end side of the valve core 20 exceeds that of the proximal end side by a predetermined level, the valve body 23 separates from the proximal end opening 21C of the tubular core body 21 to allow the fluid to pass through the valve core 20.

As illustrated in FIG. 1, an external thread 11B is formed on an outer circumferential surface of a distal end portion of the valve stem 11, and a valve cap 25 is screwed thereto. The valve cap 25 is a tubular, molded resin component with a bottom at one end, formed with an internal thread 25A on an inner surface to mate with the external thread 11B. An elastomeric packing 26 is mounted on an inner deep surface. With the valve cap 25 fastened to the valve stem 11, the distal end of the valve stem 11 makes tight contact with the packing 26.

The valve stem 11 has a protruded large-diameter part 12 protruding sideways from the outer surface at the proximal end side of the center part in the axial direction. The valve stem 11 has a smaller diameter on the proximal end side of the protruded large-diameter part 12 as compared to the distal end side of the protruded large-diameter part 12. The protruded large-diameter part 12 has a distal end taper 12A (corresponding to the "stem step portion" in the claims) at the distal end where the diameter gradually reduces toward the distal end side, and a proximal end taper 12C at the proximal end where the diameter gradually reduces toward the proximal end side. An outer surface of the protruded large-diameter part 12 between the distal end taper 12A and the proximal end taper 12C is an even surface 12B (corresponding to the "large-diameter part" in the claims) extending in parallel with the axial direction.

A tire pressure detector 50 is attached to a proximal end portion of the valve stem 11. The tire pressure detector 50 includes a pressure sensor, a temperature sensor, and a wireless circuit, detects the pressure and temperature inside the tire, and wirelessly transmits the detection results to a tire monitoring system (not shown) provided on the vehicle body. The tire monitoring system monitors the presence or absence of an abnormality in pressure and temperature inside the tire based on the received detection results.

Referring back to FIG. 1, the grommet 30 covers the valve stem 11 from the center part in the axial direction to the proximal end side of the protruded large-diameter part 12. As illustrated in FIG. 2, the grommet 30 includes, on the proximal end side of an axial central part, a tapered portion 33, a press-fit portion 34 (corresponding to the "engaging groove" in the claims), and a bottom engaging portion 35, successively from the distal end side. The tapered portion 33 gradually increases in diameter toward the proximal end side, the press-fit portion 34 is cylindrical with a slightly smaller diameter than that of the proximal end portion of the tapered portion 33, and the bottom engaging portion 35 is cylindrical with a larger diameter than that of the press-fit portion 34.

Figure 2:
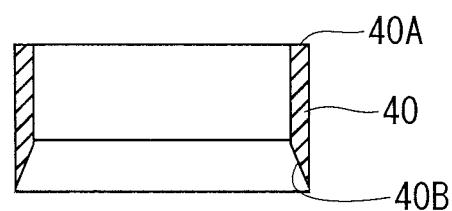
FIG. 2 is an exploded cross-sectional view of a grommet.
Figure 2:
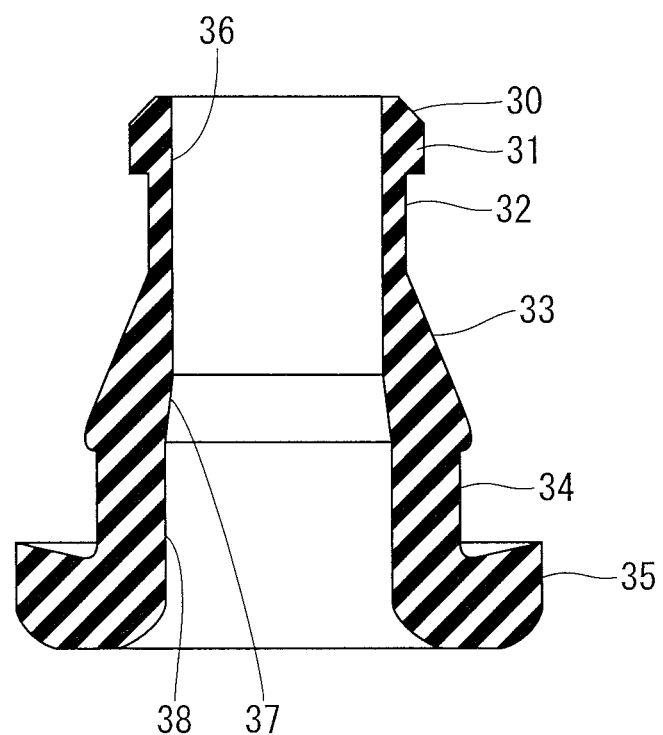
Figure 3:
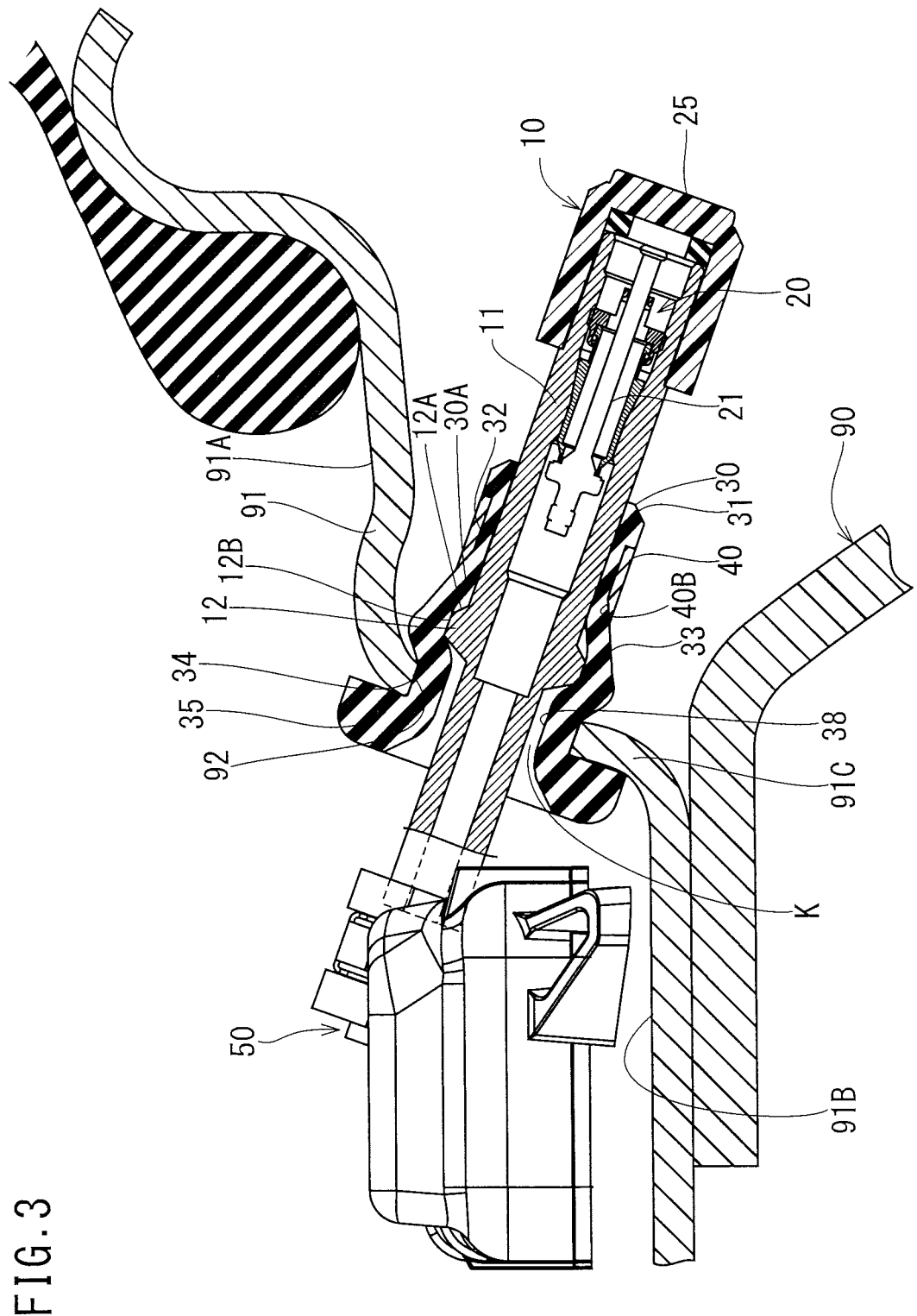
FIG. 3 is a cross-sectional side view of the tire valve in a state attached to a tire wheel.

As illustrated in FIG. 2, before being attached to the valve stem 11, the grommet 30 has an inner surface that is made up of a first even surface 36, a tapered surface 37, and a second even surface 38, successively from the distal end side. The first even surface 36 extends from the distal end of the grommet 30 to a middle part of the tapered portion 33 in parallel with the axial direction. The second even surface 38 is slightly larger in diameter than the first even surface 36, and extends from the proximal end of the tapered portion 33 to a point close to the proximal end portion of the grommet 30 in parallel with the axial direction. The tapered surface 37 is a slope connecting the first even surface 36 and the second even surface 38. The proximal end portion of the inner surface of the grommet 30 is a rounded surface.

As illustrated in FIG. 1, in a state in which the grommet 30 is attached to the valve stem 11, the protruded large-diameter part 12 of the valve stem 11 is positioned inside the tapered portion 33 and the press-fit portion 34, so that the inner parts of the tapered portion 33 and the press-fit portion 34 are pressed by the protruded large-diameter part 12 and elastically deformed. The tapered surface 37 makes contact with the even surface 12B of the protruded large-diameter part 12 of the valve stem 11. The first even surface 36 makes contact with part of the valve stem 11 above the protruded large-diameter part 12. Between the second even surface 38 and part of the valve stem 11 on the proximal end side of the protruded large-diameter part 12 is formed a gap K. While there is formed a small gap between the distal end taper 12A of the protruded large-diameter part 12 and the grommet 30 in the example illustrated in FIG. 1, another design without such a gap is also possible.

As illustrated in FIG. 1, a metal ring 40 is mounted on an outer surface of the grommet 30 on the distal end side of the protruded large-diameter part 12 of the valve stem 11. As illustrated in FIG. 2, the ring 40 is cylindrical, and has a distal end face 40A extending perpendicularly to the axial direction, and a proximal end face 40B in a tapered shape, with a diameter gradually reducing toward the distal end side. This taper on the proximal end face 40B has substantially the same gradient as that of the tapered portion 33 of the grommet 30. The ring 40 has an inside diameter that is substantially equal to an outside diameter of the even surface 12B of the protruded large-diameter part 12.

In a distal end portion of the grommet 30 is provided a retaining protrusion 31 that protrudes sideways and prevents the ring 40 from coming off. The outer edge at the distal end side of the retaining protrusion 31 is tapered, while the proximal end face of the retaining protrusion 31 (corresponding to the "grommet step portion" in the claims) extends perpendicularly to the axial direction. Between this retaining protrusion 31 and the tapered portion 33 is provided a ring accommodating groove 32 that receives the ring 40. As illustrated in FIG. 1, in a state where the ring 40 is mounted in the ring accommodating groove 32 of the grommet 30, the distal end face 40A of the ring 40 makes contact with the proximal end portion of the retaining protrusion 31, and the proximal end face 40B of the ring 40 makes contact with a distal end portion of the tapered portion 33.

Since this ring 40 is mounted on the grommet 30, in a state in which the grommet 30 is mounted on the valve stem (state shown in FIG. 1), part of the grommet 30 is held between the ring 40 (in particular, the proximal end face 40B) and the protruded large-diameter part 12 of the valve stem 11 (in particular, the distal end taper 12A or the outer edge thereof). This portion held between the ring 40 and the protruded large-diameter part 12 is referred to as a pressed portion 30A.

The tire valve 10 is produced as follows. First, the ring 40 is attached over the grommet 30 from the distal end side of the grommet 30. At this time, the ring 40 can be easily pushed toward the proximal end side because the outer edge on the distal end side of the retaining protrusion 31 and the proximal end face 40B of the ring 40 are tapered. Once the ring 40 passes through the retaining protrusion 31, the distal end face 40A makes contact with the proximal end face of the retaining protrusion 31, and the ring 40 is received in the ring accommodating groove 32, while the proximal end face 40B contacting the distal end portion of the tapered portion 33.

Next, the grommet 30 with the ring 40 attached thereon is fitted on the valve stem 11 from the distal end side, and the grommet 30 is pushed toward the proximal end side of the valve stem 11. The grommet 30 is pushed further until the tapered surface 37 inside the grommet 30 reaches the protruded large-diameter part 12 of the valve stem 11. As the ring 40 approaches the protruded large-diameter part 12, the resistance when the grommet 30 is pushed toward the proximal end side increases, which completes the mounting of the grommet 30.

The structure of the tire valve 10 according to this embodiment is as has been described above. Next, the advantageous effects of the tire valve 10 will be explained. As illustrated in FIG. 3, when in use, the tire valve 10 is attached to a tire wheel 90. The tire wheel 90 includes, in its tire rim 91, a large-diameter part 91A positioned on the outer side in the vehicle width direction, a small-diameter part 91B positioned on the inner side in the vehicle width direction, and an upright part 91C connecting the large-diameter part 91A and the small-diameter part 91B, with a valve attachment hole 92 drilled through the upright part 91C.

The tire valve 10 is pressed into this valve attachment hole 92 from inside of the tire rim 91. Specifically, the distal end portion of the tire valve 10 is inserted into the valve attachment hole 92 in an orientation in which the tire pressure detector 50 is positioned inside the tire wheel 90. When the tapered portion 33 of the grommet 30 makes contact with the opening edge of the valve attachment hole 92, the distal end portion of the tire valve 10 (the distal end portion of the valve stem 11) is grasped with a tool (not shown) and pulled from outside of the tire rim 91, to press the press-fit portion 34 of the tire valve 10 into the valve attachment hole 92. Once the tire valve 10 is attached to the tire wheel 90, the grommet 30 is deformed such that the press-fit portion 34 is shifted from the protruded large-diameter part 12 of the valve stem 11 toward the proximal end side.

Here, when the valve stem 11 is pulled toward the distal end side with the grommet 30 in frictional engagement with the valve attachment hole 92, the valve stem 11 receives a load applied toward the distal end side relative to the grommet 30, which means that the grommet 30 receives a load applied toward the proximal end side relative to the valve stem 11. This load may cause the grommet 30 to deform such that a portion thereof on the distal end side of the protruded large-diameter part 12 of the valve stem 11 rides over the protruded large-diameter part 12, in which case there is a concern that the grommet 30 may come off of the valve stem 11.

In contrast thereto, since the tire valve 10 of this embodiment includes the ring 40 mounted on the grommet 30 on the distal end side of the protruded large-diameter part 12 of the valve stem 11. When the grommet 30 receives a load applied toward the proximal end side relative to the valve stem 11, the ring 40 receives a force that causes it to approach the protruded large-diameter part 12, whereby a portion of the grommet 30, i.e., the pressed portion 30A, is pressed between the ring 40 and the protruded large-diameter part 12. This suppresses the elastic deformation of the grommet 30 in which a portion thereof on the distal end side of the protruded large-diameter part 12 rides over the protruded large-diameter part 12, and prevents the grommet 30 from coming off of the valve stem 11.

Moreover, since the ring 40 has an inside diameter that is substantially the same as the outside diameter of the even surface 12B of the protruded large-diameter part 12, it is unlikely that the ring 40 will move over to the proximal end side of the protruded large-diameter part 12, considering the thickness of the grommet 30. This increases the steadiness of the press between the ring 40 and the protruded large-diameter part 12 and can prevent separation of the grommet 30 from the valve stem 11 more reliably.

The retaining protrusion 31 of the grommet 30 makes contact with the ring 40 from the distal end side so that the ring 40 is prevented from coming off of the grommet 30 from the distal end side. The tapered portion 33 of the grommet 30 makes contact with the ring 40 from the proximal end side so that the ring 40 is kept in a stable position. Since the ring 40 is attached to the grommet 30 before the grommet 30 is mounted to the valve stem 11, the grommet 30 can readily deform elastically when the ring 40 is attached to the grommet 30, which makes the attachment of the ring 40 easy.

Since the proximal end face 40B of the ring 40 and the distal end taper 12A of the protruded large-diameter part 12 are tapered, i.e., the portions contacting the inner side of the pressed portion 30A that is likely to receive the load by being pressed by the protruded large-diameter part 12 are not sharp or pointed, so that the grommet 30 is prevented from being damaged.

The protruded large-diameter part 12 of the valve stem 11 that is arranged inside the tapered portion 33 and press-fit portion 34 of the grommet 30 enhances the seal between the tire wheel 90 and the grommet 30 and between the grommet 30 and the valve stem 11, because part of the grommet 30 is pressed between the opening edge of the valve attachment hole 92 of the tire wheel 90 and the protruded large-diameter part 12 of the valve stem 11, in a state where the tire valve 10 is attached to the tire wheel 90.

Attachment is made easy by the configuration in which there is a gap between the second even surface 38 of the grommet 30 and a lower part of the valve stem 11 below the protruded large-diameter part 12, which allows easy elastic deformation of the grommet 30 when the tire valve 10 is attached to the valve attachment hole 92.

Some of conventional tire valves use elastomer joined to the valve stem by vulcanization bonding as the elastic member to be pressed into the valve attachment hole. The tire valve 10 of this embodiment has the grommet 30 formed separately from the valve stem 11, which allows a wider variation of materials to be used for the grommet 30 and the valve stem 11. This enables use of a material that has a high rigidity but can hardly be joined with elastomer by vulcanization bonding, for the valve stem, for example, which in turn enables production of a tire valve that can withstand use under high pressure conditions.

Second Embodiment

Hereinafter, a tire valve 10W of this embodiment will be described with reference to FIG. 4 to FIG. 6. A grommet 30W of the tire valve 10W of this embodiment has a different structure from that of the grommet 30 of the first embodiment described in the foregoing.

Figure 4:
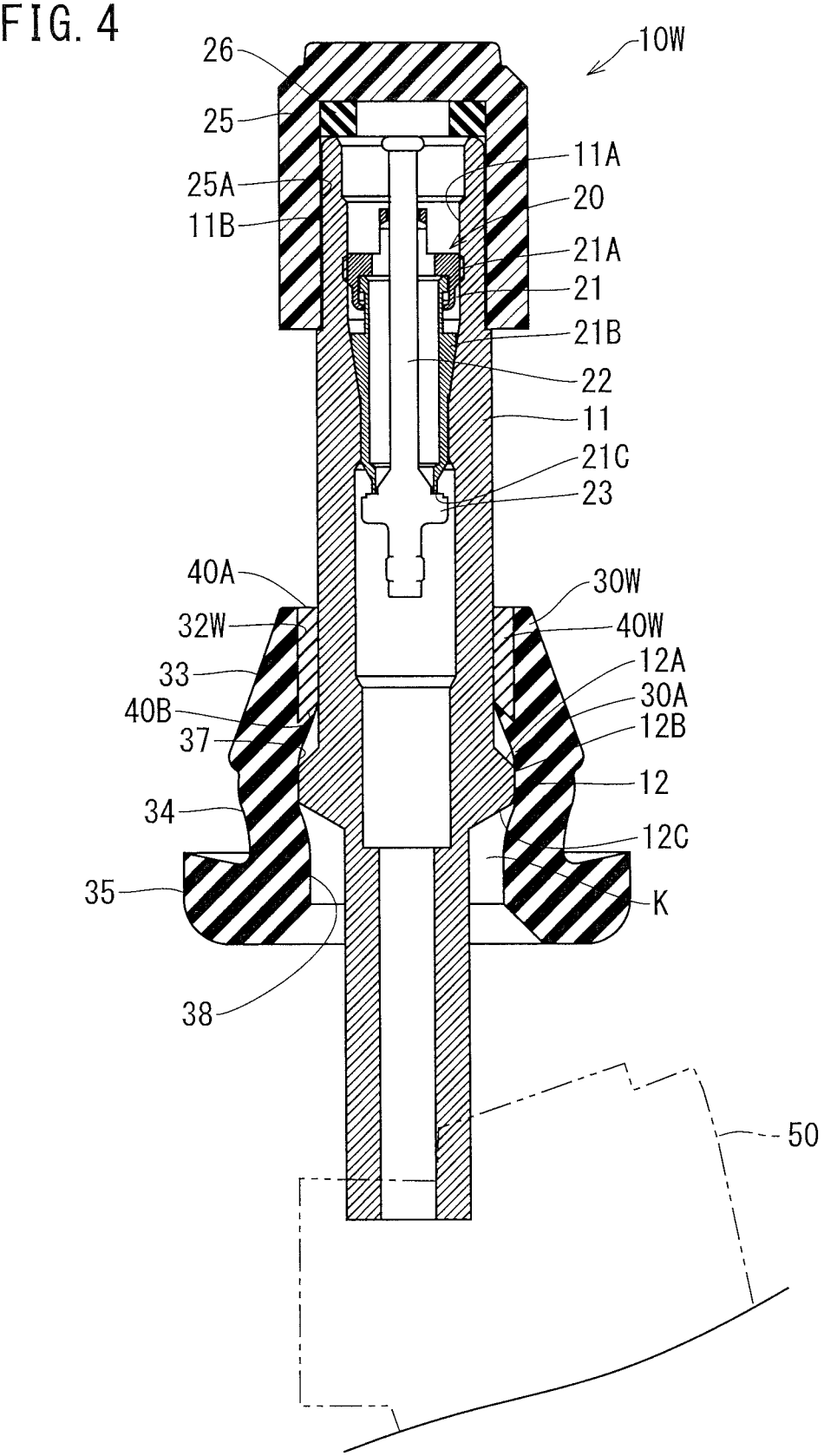
FIG. 4 is a cross-sectional side view of a tire valve according to a second embodiment.

As illustrated in FIG. 4, the grommet 30W of this embodiment has nothing on the distal end side of a tapered portion 33, and a ring 40W is arranged inside the tapered portion 33, as compared to the grommet 30 of the first embodiment described above.

Figure 5:
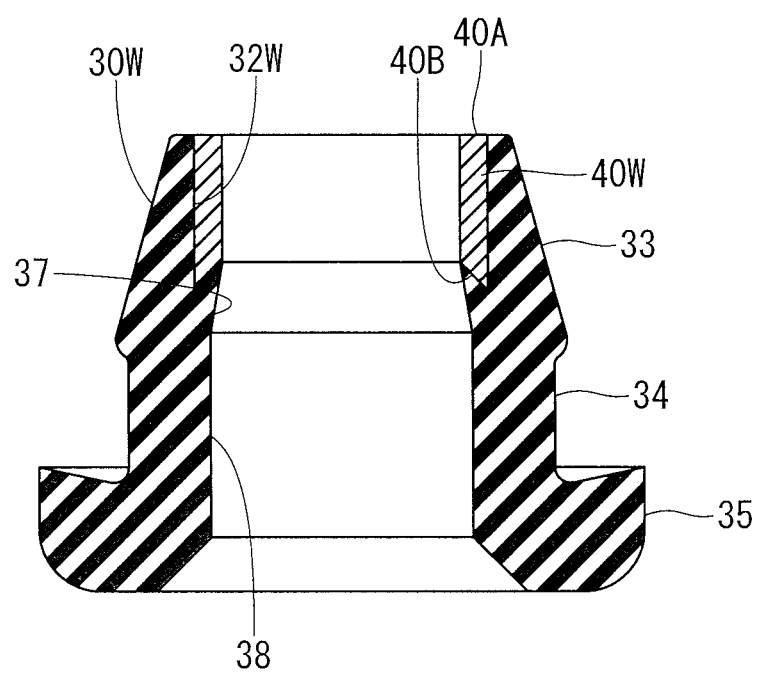
FIG. 5 is a cross-sectional side view of a grommet.

As illustrated in FIG. 5, the ring 40W of this embodiment has a distal end face 40A perpendicular to the axial direction, and a tapered proximal end face 40B, similarly to the ring 40 of the first embodiment described above. The ring 40W has a smaller diameter than that of the ring 40 of the first embodiment described above and can make contact with an outer surface of the valve stem 11. Namely, the ring 40W has an inside diameter that is smaller than the outside diameter of the even surface 12B of the protruded large-diameter part 12 of the valve stem 11.

As illustrated in FIG. 5, the grommet 30W before being mounted to the valve stem 11 includes, on the inner surface, successively from the distal end side, a ring accommodating portion 32W that receives the ring 40W, a tapered surface 37, and a second even surface 38. The ring accommodating portion 32W is open on the upper side and inner side, while the lower surface is inclined toward the distal end side as extending radially inward corresponding to the proximal end face 40B of the ring 40W. In this embodiment, the ring 40W is joined to the grommet 30W by vulcanization bonding.

Figure 6:
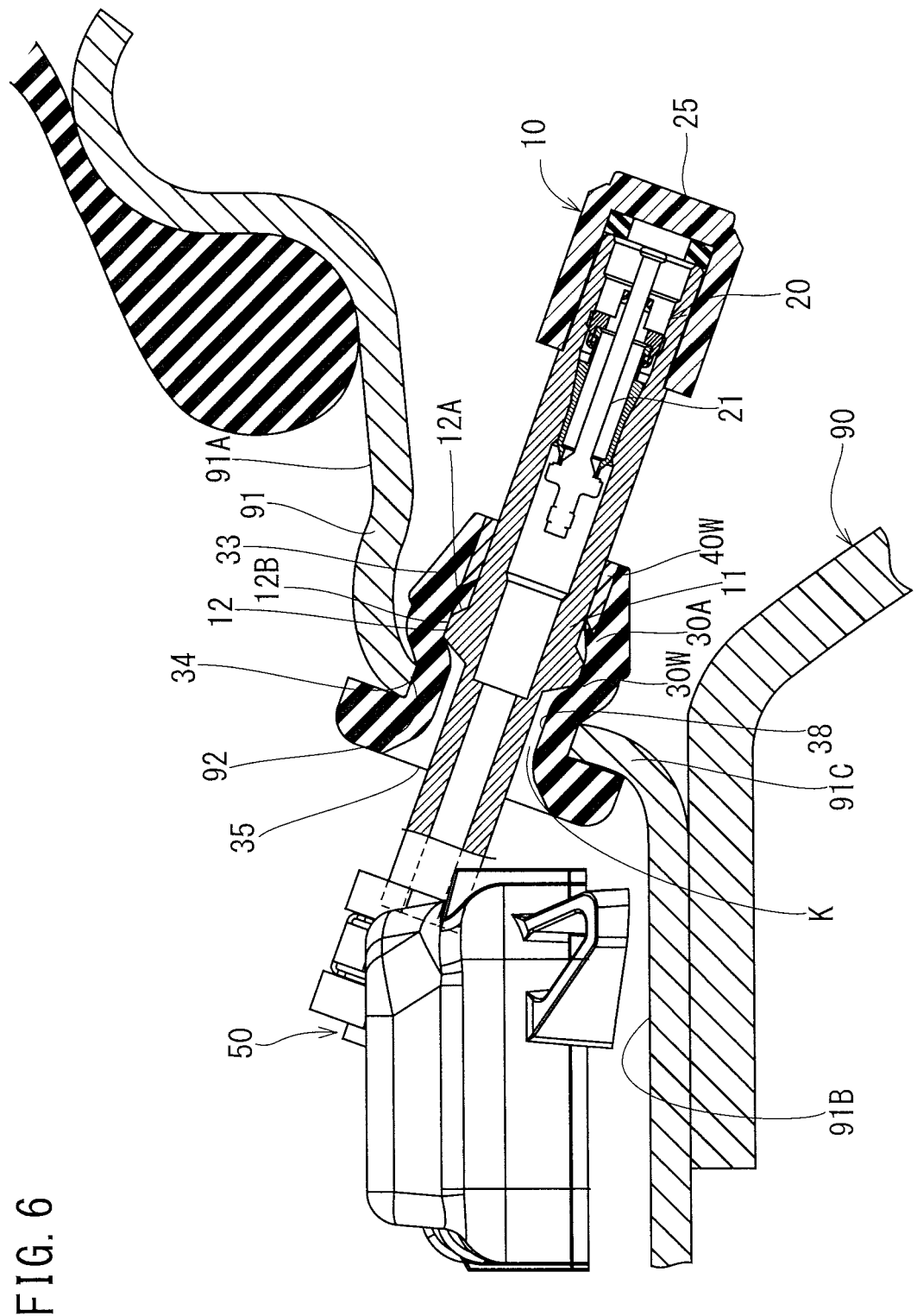
FIG. 6 is a cross-sectional side view of the tire valve in a state attached to a tire wheel.

As illustrated in FIG. 6, in a state where the grommet 30W is mounted to the valve stem 11, a distal end portion of the second even surface 38 of the grommet 30W makes contact with the even surface 12B of the protruded large-diameter part 12 of the valve stem 11, and part of the grommet 30W (pressed portion 30A) is held between the ring 40W and the protruded large-diameter part 12.

Similarly to the tire valve 10 of the first embodiment described above, when the tire valve 10W of this embodiment is attached to the valve attachment hole 92 of the tire wheel 90, the grommet 30W receives a load applied toward the proximal end side relative to the valve stem 11, while the ring 40W receives a force that causes it to approach the protruded large-diameter part 12, whereby a portion of the grommet 30W, i.e., the pressed portion 30A, is pressed between the ring 40W and the protruded large-diameter part 12. This suppresses the elastic deformation of the grommet 30W in which a portion thereof on the distal end side of the protruded large-diameter part 12 rides over the protruded large-diameter part 12, and prevents the grommet 30W from coming off of the valve stem 11.

Moreover, since the ring 40W has a smaller inside diameter than the outside diameter of the even surface 12B of the protruded large-diameter part 12, the ring 40W does not move toward the proximal end side of the protruded large-diameter part 12, which increases the steadiness of the press between the ring 40W and the protruded large-diameter part 12 and can prevent separation of the grommet 30W from the valve stem 11 more reliably.

Figure 7:
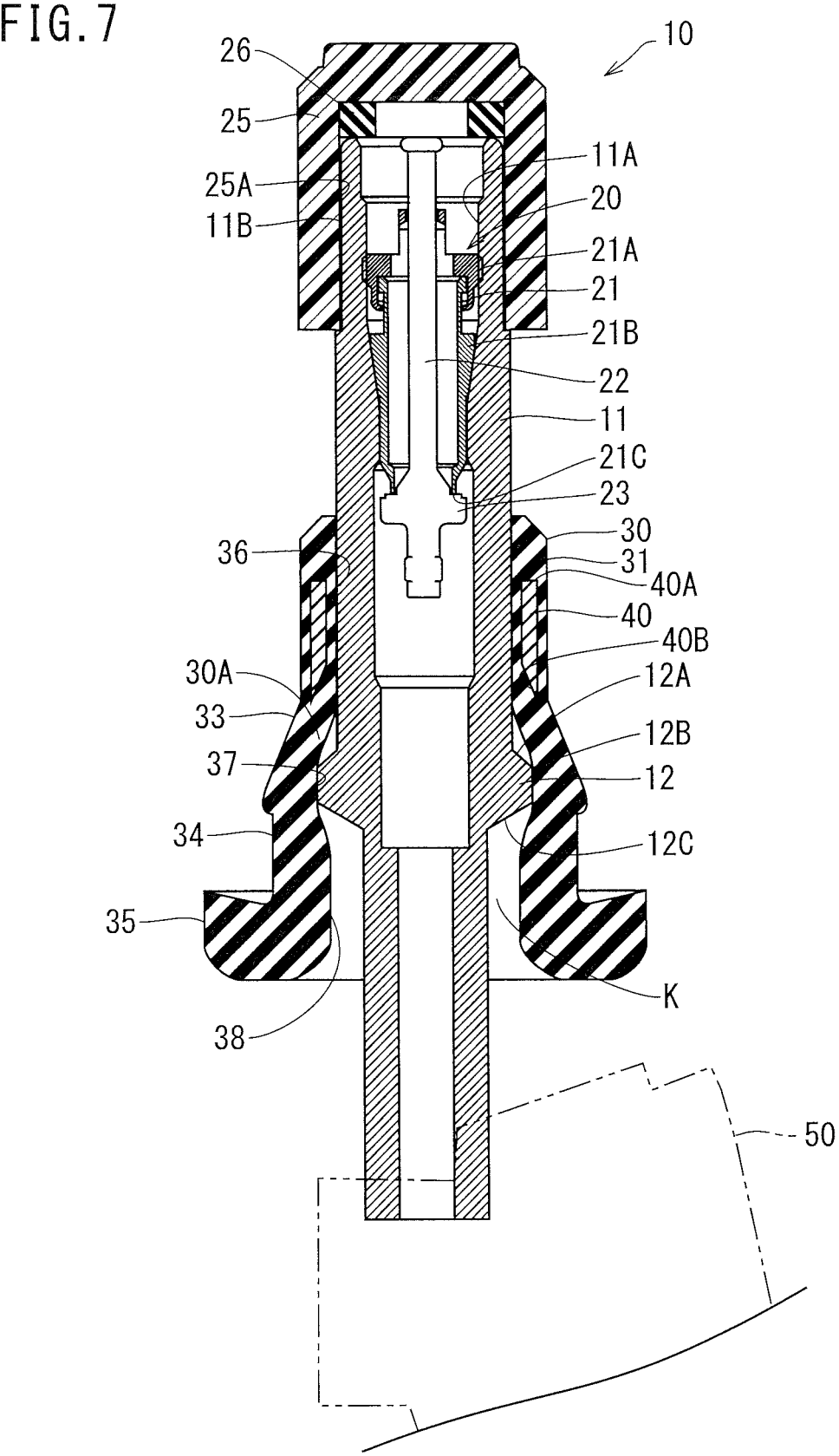
FIG. 7 is a cross-sectional side view of a tire valve according to a variation example.

Other Embodiments (1) The ring 40 or 40W may be embedded in the grommet 30 or 30W. FIG. 7 illustrates an example in which the ring 40 is embedded in the grommet 30 in the tire valve 10 of the first embodiment described above. In this case, corrosion of the ring 40 or 40W is prevented.

(2) Another configuration in which the grommet 30 or 30W makes contact with a portion of the valve stem 11 on the proximal end side of the protruded large-diameter part 12 is also possible.

(3) The ring 40 or 40W may be made of resin or the like as long as it has a higher rigidity than the grommet 30 or 30W.

Figure 8:
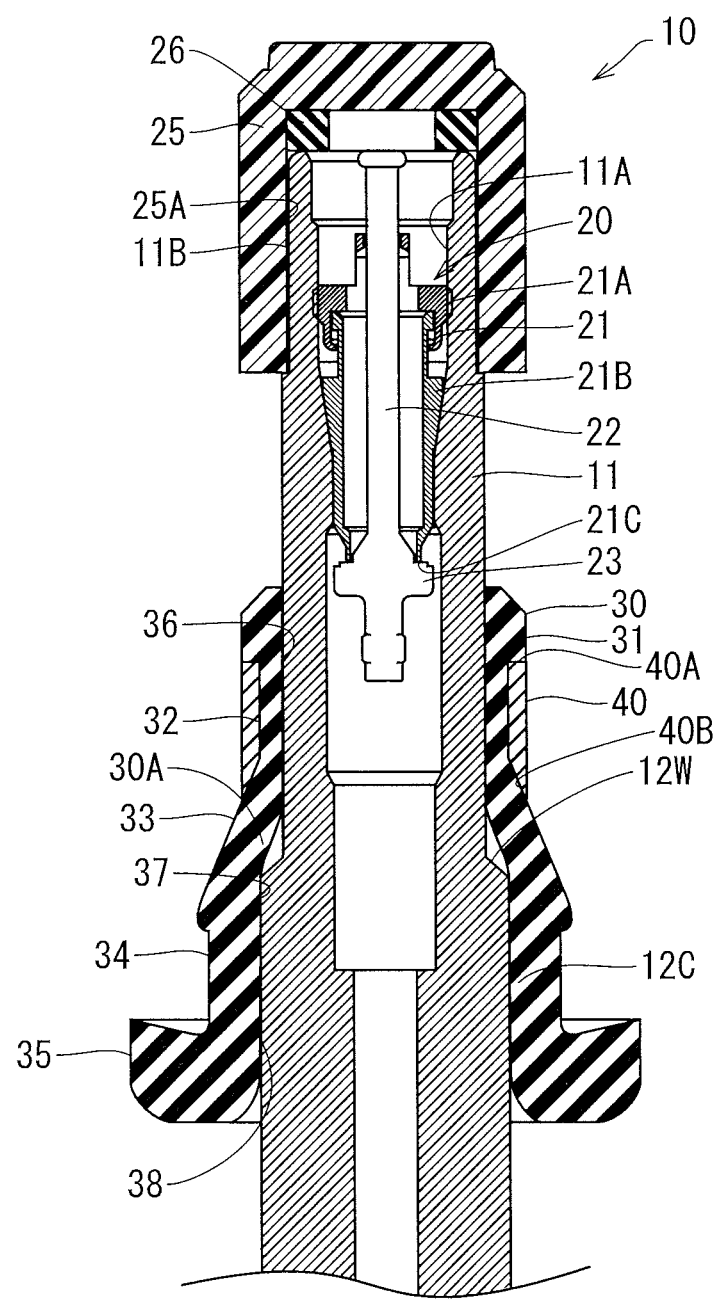
FIG. 8 is a cross-sectional side view of a tire valve according to a variation example.

(4) While the valve stem 11 in the embodiments described above has the protruded large-diameter part 12 midway in the axial direction, the valve stem may have a step portion 12W midway in the axial direction and the proximal end side from there down may have a larger diameter, as illustrated in FIG. 8.

(5) While the protruded large-diameter part 12 in the embodiments described above has an even surface 12B and a substantially trapezoidal cross section, the protruded large-diameter part may have a triangular, or arcuate, cross section. The protruded large-diameter part may be provided intermittently in the circumferential direction.

(6) The ring 40, 40W may be provided with a slit in some parts in the circumferential direction.

(7) In the second embodiment, the ring 40W may be retrofitted and bonded to the grommet 30W with an adhesive or the like.

(8) In the first embodiment, the ring 40 may be mounted to the grommet 30 after the grommet 30 has been mounted to the valve stem 11.

(9) The distal end face of the protruded large-diameter part 12 (distal end taper 12A) and the step portion 12W may extend perpendicularly to the axial direction of the valve stem 11 instead of being tapered.

While specific examples of the techniques included in the claims are disclosed in the specification and drawings, the techniques set forth in the claims are not limited to these specific examples but rather include various modifications and alterations of the specific examples, as well as partial and separate extracts from the specific examples.

DESCRIPTION OF THE REFERENCE NUMERAL 10, 10W Tire valve
11 Valve stem
12 Protruded large-diameter part
12A Distal end taper (stem step portion)
30, 30W Grommet
30A Pressed portion
31 Retaining protrusion
32 Ring accommodating groove
33 Tapered portion
34 Press-fit portion
40, 40W Ring
40A Distal end face
40B Proximal end face

The invention claimed is:

1. A tire valve including a grommet fitted on an outside of a valve stem on a proximal end side, which is one end side of the valve stem, the tire valve being inserted into a valve attachment hole of a tire wheel from a distal end side, which is an other end side of the valve stem, the grommet having a proximal end portion engaging with the valve attachment hole, the tire valve comprising:
   a stem step portion provided on an outer surface of the valve stem in a portion where the grommet is fitted, the stem step portion increasing in diameter at the proximal end side, and facing toward the distal end side,
   a ring provided on the grommet in a portion on the distal end side of the stem step portion of the valve stem, and restricting axial movements of the ring relative to the grommet, and
   a pressed portion provided on the grommet between the stem step portion and the ring, to be pressed between the stem step portion and the ring wherein the grommet receives a load applied toward the proximal end side of the valve stem,
   wherein the ring is arranged radially outside the grommet, and
   wherein the grommet is provided with a grommet step portion on an outer surface thereof so as to face the ring from the distal end side.

2. The tire valve according to claim 1 wherein the ring has an inside diameter substantially equal to a diameter of an outer periphery of the stem step portion.

3. The tire valve according to claim 1, wherein the grommet is formed with a ring accommodating groove on the outer surface thereof, the groove accommodating the ring and including the grommet step portion in a distal end portion thereof.

4. The tire valve according to claim 2, wherein the grommet is formed with a ring accommodating groove on the outer surface thereof, the groove accommodating the ring and including the grommet step portion in a distal end portion thereof.

5. The tire valve according to claim 1, wherein the stem step portion has a tapered surface that comes closer to a center axis of the valve stem toward the distal end side.

6. The tire valve according to claim 1, wherein the ring has a tapered surface in a proximal end portion where an inner surface is tapered outward toward the proximal end side.

7. The tire valve according to claim 1, wherein the grommet includes, on the outer surface thereof, an engaging groove that engages with an opening edge of the valve attachment hole, and a tapered portion extending from the engaging groove and decreasing in diameter toward the distal end side,
   the valve stem includes a large-diameter part extending from an outer edge of the stem step portion toward the proximal end side,
   the large-diameter part being positioned on a radially inner side of the engaging groove or the tapered portion of the grommet.

8. The tire valve according to claim 1, wherein the pressed portion is located in a middle portion in the axial direction of the grommet, and
- a gap is formed between the one end side of the stem step portion of the valve stem and the grommet.

9. A method for producing the tire valve according to claim 1, wherein
- the grommet is fitted over the valve stem from the distal end side after the ring has been fixed to or engaged with the grommet.

* * * * *